(12) United States Patent
Ohta

(10) Patent No.: US 7,833,098 B2
(45) Date of Patent: Nov. 16, 2010

(54) INPUT DATA PROCESSING PROGRAM AND INPUT DATA PROCESSING APPARATUS

(75) Inventor: Keizo Ohta, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 1086 days.

(21) Appl. No.: 11/447,919

(22) Filed: Jun. 7, 2006

(65) Prior Publication Data
US 2007/0018950 A1 Jan. 25, 2007

(30) Foreign Application Priority Data
Jun. 24, 2005 (JP) ............... 2005-185080

(51) Int. Cl.
G06F 19/00 (2006.01)
A63F 13/10 (2006.01)
(52) U.S. Cl. ............... 463/37; 463/30; 463/31; 463/36; 463/43
(58) Field of Classification Search ............... 345/156, 345/157, 162, 173, 174; 178/18.01, 18.03, 178/18.06; 702/127, 150, 155, 158; 463/30, 463/31, 36, 37, 43
See application file for complete search history.

(56) References Cited

U.S. PATENT DOCUMENTS

| | | | |
|---|---|---|---|
| 5,574,479 A | 11/1996 | Odell | |
| 5,627,565 A | 5/1997 | Morishita et al. | |
| 6,982,697 B2 | 1/2006 | Wilson et al. | |
| 7,139,983 B2 | 11/2006 | Kelts | |
| 7,158,118 B2 | 1/2007 | Liberty | |
| 7,262,760 B2 | 8/2007 | Liberty | |
| 7,292,151 B2 | 11/2007 | Ferguson et al. | |
| 7,414,611 B2 | 8/2008 | Liberty | |
| 7,424,388 B2 * | 9/2008 | Sato ............... | 702/152 |
| 7,641,551 B2 * | 1/2010 | Iwamoto et al. ............... | 463/36 |
| 2002/0012013 A1 * | 1/2002 | Abe et al. ............... | 345/764 |
| 2004/0189521 A1 * | 9/2004 | Smith et al. ............... | 342/387 |

(Continued)

FOREIGN PATENT DOCUMENTS

JP 63-73415 4/1988

OTHER PUBLICATIONS

ADXL202 Specification Sheet: Low Cost ±2 g Dual Axis i MEMs® Accelerometer with Digital Output; Analog Devices, Inc., 1998.

(Continued)

*Primary Examiner*—My-Chau T Tran
(74) *Attorney, Agent, or Firm*—Nixon & Vanderhye P.C.

(57) ABSTRACT

An information processing apparatus stores a series of input positions which are continuously detected by an input device in a memory thereof in order of the detection. An input position (B1) initially stored in the memory is stored as a reference point position in the memory. When each of the series of input positions is stored in the memory, an operation vector (vector v'1) connecting between an input position having been most recently stored in the memory and the reference point position in the memory is calculated. The information processing apparatus performs a predetermined processing using a magnitude and a direction of the operation vector. The reference point position stored in the memory is updated to a position obtained when the reference point position is moved toward a predetermined target position (point A) when each of the series of input positions is stored in the memory.

18 Claims, 12 Drawing Sheets

U.S. PATENT DOCUMENTS

2006/0094502 A1*  5/2006  Katayama et al. ............. 463/31
2007/0046647 A1*  3/2007  Ohta ........................... 345/173
2009/0187371 A1*  7/2009  Ohta ........................... 702/151

OTHER PUBLICATIONS

ADXL330 Specification Sheet: Small, Low Power, 3-Axis ±3 g i MEMs® Accelerometer; Analog Devices, Inc., 2007.

Pictures of Microsoft Xwand retrieved on May 13, 2009 from http://www.kf12.com/blogs/uploads/xwand.jpg and http://www.cs.cmu.edu/%7Edwilson/images/xwand.jpg.

Wilson, Andrew D., et al.; "Demonstration of the XWand Interface for Intelligent Spaces"; Microsoft Research; UIST '02 Companion; pp. 37-38.

Wilson, Andy, "XWand: UI for Intelligent Environments"; Apr. 26, 2004; retrieved May 12, 2009 from http://research.microsoft.com/en-us/um/people/awilson/wand/default.htm.

* cited by examiner

INPUT DATA PROCESSING PROGRAM AND INPUT DATA PROCESSING APPARATUS

CROSS REFERENCE OF RELATED APPLICATION

The disclosure of Japanese Patent Application No. 2005-185080 is incorporated herein by reference.

BACKGROUND

1. Field

Present example embodiments of the technology described herein relate to an input data processing program and an input data processing apparatus for processing data inputted from an input device such as a touch pad.

2. Description of the Background Art

Conventionally, a technique for moving a cursor displayed on a screen of a display device by using a touch pad and the like has been utilized. In this technique, the touch pad has a predetermined position (for example, the center of the touch pad) set as a reference point, and the cursor moves on the screen in accordance with a direction and a distance from the reference point to a touch point (a position at which an operator touches the touch pad). Japanese Laid-Open Patent Publication No. 63-73415 discloses that when coordinates of a tablet are inputted, a cursor is moved at a speed proportional to a distance between a reference point and a point at which a pen touches the tablet in the direction therebetween.

In the aforementioned technique, there is a problem that a touch position at which the operator touches the touch pad or the like does not necessarily fall on her or his intended touch position. That is, when the operator starts to make inputs to the touch pad, the operator sometimes attempts to initially touch the reference point on the touch pad so as not to move the cursor. However, it is sometimes difficult for the operator to accurately designate the reference point, so that the touch point at which the operator touches the touch pad or the like may be slightly offset from the reference point. In this case, although the operator does not intend to move the cursor, the cursor may actually be moved. Thus, in the aforementioned technique, when the operator starts to make inputs to the touch pad, the cursor is moved against the operator's intention, thereby degrading the controllability for the operator.

SUMMARY

Therefore, an aspect of present example embodiments is to provide an input data processing program and an input data processing apparatus capable of enhancing controllability of a pointing device.

The present example embodiments have the following features to attain the aspect mentioned above. The reference numerals, supplementary description and the like in the parentheses described below are provided to indicate the correspondence with the embodiment described later in order to aid in understanding the present example embodiments and are not intended to limit, in any way, the scope of the present invention.

A first aspect of the present example embodiments is directed to a computer-readable storage medium having stored thereon an input data processing program (game program) which causes a computer (CPU 22), of an information processing apparatus (game apparatus 10) comprising an input device (touch pad 21) for detecting input positions on an input surface at intervals of a predetermined time period, to execute the following steps. The input data processing program causes the computer to execute: a reference point position storage step (S17); an operation vector calculation step (S3); and a process step (S4). In the reference point position storage step, the information processing apparatus stores, as a reference point position (a reference point 62 shown in FIG. 3), an initially detected input position among a series of input positions which are continuously detected, in a memory (main memory 34) of the information processing apparatus. In the operation vector calculation step, the information processing apparatus calculates, when each of the series of input positions is detected, an operation vector (vector v'1 shown in FIG. 4) connecting between an input position having been most recently detected and the reference point position stored in the memory. In the process step, the information processing apparatus performs a predetermined process (for example, a process of moving a player character or a cursor displayed on a screen) using a magnitude and a direction of the operation vector.

In a second aspect, the input data processing program may cause the computer to further execute an update step. The input data processing program causes the information processing apparatus to update the reference point position to a position other than the initially detected input position.

In a third aspect, the update step may gradually move the reference point position from the initially detected input position toward a predetermined target position (point A shown in FIG. 3).

In a fourth aspect, the update step may update the reference point position when each of the series of input positions is detected.

In a fifth aspect, the update step may include: a motion vector calculation step (S13); a moving distance calculation step (S22); and an update execution step (S25). In the motion vector calculation step, the information processing apparatus calculates a motion vector (vector v1 shown in FIG. 4) ending at the input position having been most recently detected and starting at an input position immediately preceding the input position having been most recently detected. The moving distance calculation step calculates a moving distance of the reference point position using at least one of a magnitude and a direction of the motion vector. The update execution step updates the reference point position stored in the memory to a position obtained when the reference point position is moved toward a predetermined target position over the moving distance.

In a sixth aspect, the moving distance calculation step may calculate the moving distance so that the larger magnitude the motion vector has, the longer the moving distance is.

In a seventh aspect, the moving distance calculation step may calculate the moving distance so that the closer a direction of the motion vector is to a direction of a straight line connecting between the reference point position and the target position, the longer the moving distance is.

In an eighth aspect, the moving distance calculation step may calculate the moving distance so that the larger component the motion vector has in a direction (a direction of a center) of a straight line connecting between the reference point position and the target position, the longer the moving distance is.

In a ninth aspect, the update step may further include an adjustment step (S23, S24). In the adjustment step, the computer adjusts, when the moving distance having been calculated is longer than a distance from the reference point position to the target position, the moving distance to the distance from the reference point position to the target position. At this time, the update execution step updates the reference point position stored in the memory using the moving distance having been adjusted.

In a tenth aspect, the update step may include a motion vector calculation step (S13); a determination step (S31); and an update execution step (S25). The motion vector calculation step calculates a motion vector ending at the input position having been most recently detected and starting at an input position immediately preceding the input position having been most recently detected. The determination step determines whether or not a magnitude of the motion vector has a value larger than a predetermined value. The update execution step updates the reference point position stored in the memory only when the determination step determines that the magnitude of the motion vector has a value larger than the predetermined value.

In an eleventh aspect, the target position may represent a center of the input surface.

In a twelfth aspect, the reference point position storage step may store, when the input position which is initially stored in the memory is within a predetermined area (determination area 63) including the target position, the input position as the reference point position in the memory, and may store, when the input position is outside the predetermined area, the target position as the reference point position in the memory.

A thirteenth aspect of the present example embodiments is directed to an input data processing apparatus (game apparatus 10) comprising an input device (touch pad 21) for detecting input positions on an input surface at intervals of a predetermined time period. The input data processing apparatus includes a reference point position storage means (main memory 34); an operation vector calculation means (CPU 22 for executing step S3, or the like); and a processing means (step S4). The reference point position storage means stores, as a reference point position, an initially detected input position among a series of input positions which are continuously detected. The operation vector calculation means calculates, when each of the series of input positions is detected, an operation vector connecting between an input position having been most recently detected and the reference point position stored in the reference point position storage means. The processing means performs a predetermined process using a magnitude and a direction of the operation vector.

A fourteenth aspect of the present example embodiments is directed to an input device connectable to an input data processing apparatus for executing a predetermined data processing in accordance with input data. The input device comprises: an input detection means (touch pad 21); a reference point position storage means; an operation vector calculation means; and a transmitting means. The input detection means detects input positions on an input surface at intervals of a predetermined time period. The reference point position storage means stores, as a reference point position, an initially detected input position among a series of input positions which are continuously detected. The operation vector calculation means calculates, when each of the series of input positions is detected, an operation vector connecting between an input position having been most recently detected and the reference point position stored in the reference point position storage means. The transmitting means transmits the operation vector having been calculated to the input data processing apparatus as the input data.

According to the first aspect, the reference point position storage step stores, in the memory, an input position which is initially stored in the memory as the reference point position, so that the input position is set as the reference point position immediately after a player has made the input. Therefore, the operation vector has a value "0". At this time, the information processing apparatus determines that the player is making the input so as to designate the reference point position. Accordingly, a cursor, a player character or the like, which is to be moved in accordance with the operation vector, is prevented from being moved against the player's intention. That is, according to the first aspect, an execution of a game play which is not expected by the player can be prevented. Therefore, controllability of a pointing device such as a touch pad can be enhanced.

According to the second aspect, the movement of the reference point in the update step prevents the reference point from being kept disposed in an unbalanced manner. Therefore, the controllability of the pointing device such as the touch pad can be improved.

According to the third aspect, the reference point is gradually moved toward the target position, that is, an abrupt movement of the reference point to the target position can be prevented. Therefore, the controllability of the pointing device can be enhanced.

According to the fourth aspect, the reference point is moved each time the input position is detected, thereby moving the reference point at an appropriate time. Therefore, the controllability of the pointing device can be enhanced.

According to the fifth aspect, the reference point is moved in accordance with the motion vector representing an operation performed by the player, thereby effectively preventing the player from being confused about the controllability when the reference point is moved.

According to the sixth aspect, when the player significantly moves the input position on the input surface, the moving distance of the reference point is increased. That is, the reference point is significantly moved when the player is not likely to feel confused about the controllability. Therefore, the player's confusion about the controllability can be effectively prevented and the reference point can be efficiently moved toward the target position.

According to the seventh aspect, the more approximate the moving direction of the reference point is to the direction of an input track made by the player on the input surface, the longer the moving distance of the reference point is. Accordingly, the reference point is significantly moved when the player is not likely to feel confused about the controllability. Therefore, the player's confusion about the controllability can be effectively prevented and the reference point can be efficiently moved toward the target position.

According to the eighth aspect, the moving distance of the reference point is determined based on the direction and the length of the input track made by the player on the input surface. Accordingly, the reference point can be significantly moved when the player is not likely to feel confused about the controllability. Therefore, the player' confusion about the controllability can be effectively prevented and the reference point can be efficiently moved toward the target position. Particularly, the moving distance of the reference point can be determined so as to more effectively prevent confusing the player as compared to the sixth and the seventh aspects.

According to the ninth aspect, the adjustment step adjusts the moving distance so as to be reduced to a maximum value corresponding to a distance from the current reference point position to the target position, thereby preventing the reference point from being moved beyond the target position. Therefore, according to the ninth aspect, the reference point can be moved so as to exactly reach the target position.

If the reference point is moved at a constant speed also when the player does not move the input position over a distance longer than a predetermined distance, the magnitude and the direction of the operation vector are changed against the player's intension, thereby changing an actual operation. For example, although the player is making inputs at almost the same position, the moving direction and the movement speed of the cursor or the player character are changed. That is, the actual operation is changed against the player's intension.

On the other hand, according to the tenth aspect, when the player does not move the input position over a distance longer than a predetermined distance, the update execution step does not update the reference point position, so that the operation vector is not changed. Thus, according to the tenth aspect, the operation being changed against the player's intention does not occur when the player does not move the input position over a distance longer than the predetermined distance, thereby enhancing the controllability of the pointing device.

According to the eleventh aspect, the reference point can be eventually disposed in a balanced manner.

According to the twelfth aspect, it can be determined whether the player intends to designate the target position or a position other than the target position. Accordingly, the player's intention can be more accurately reflected in the game play, thereby enhancing the controllability.

According to the thirteenth and fourteenth aspects, the same effect as that of the first aspect can be obtained.

These and other features, aspects and advantages of the present example embodiments will become more apparent from the following detailed description of the present example embodiments when taken in conjunction with the accompanying drawings.

DESCRIPTION OF THE NON-LIMITING, EXAMPLE EMBODIMENTS

Figure 1:
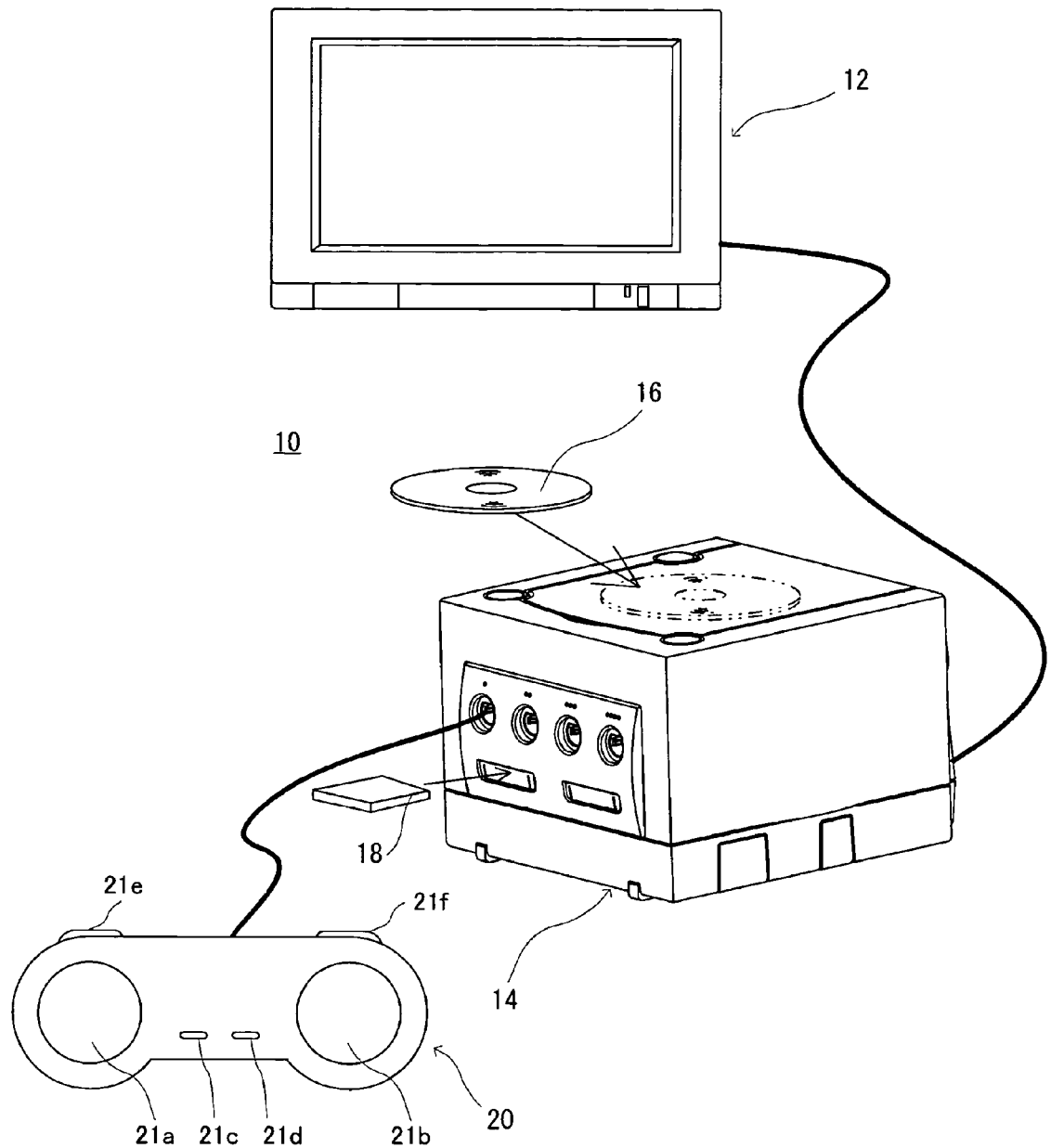
FIG. 1 is an external view illustrating a structure of a game system according to a present example embodiment.
Figure 2:
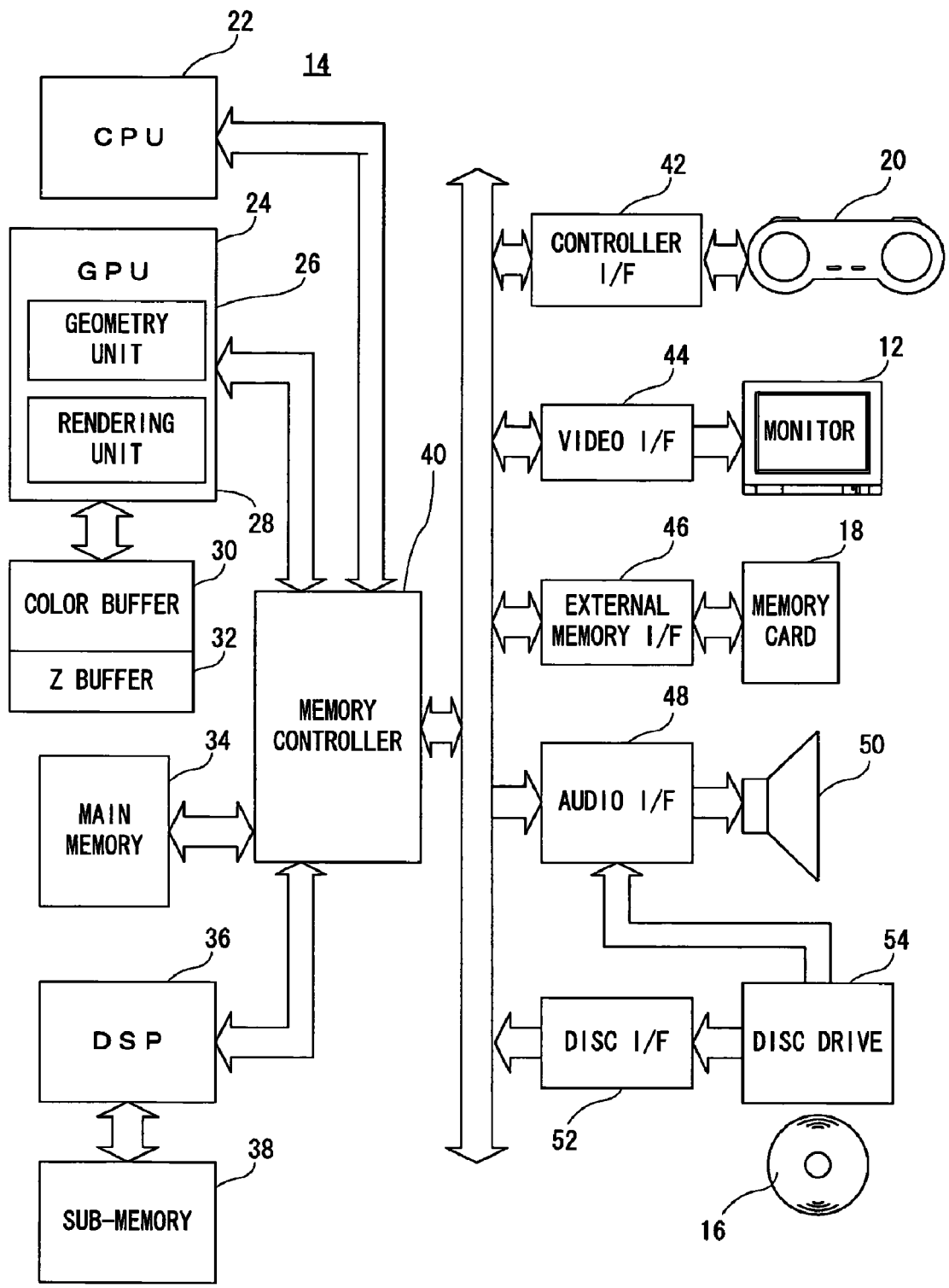
FIG. 2 is a block diagram of a game system shown in FIG. 1.

FIG. 1 is an external view illustrating a structure of a game system typifying an input data processing apparatus according to one present example embodiment, and FIG. 2 is a block diagram of the game system shown in FIG. 1. As shown in FIGS. 1 and 2, a game system 10 includes a game apparatus 14, an optical disc 16, a memory card 18, a controller 20, and a television set 12 having a speaker 50 shown in FIG. 2. The optical disc 16 and the memory card 18 are detachably mounted on the game apparatus 14. The controller 20 is connected to one of a plurality (for example, four as shown in FIG. 1) of controller port connectors of the game apparatus 14. The controller 20 has a plurality of operation sections such as a first touch pad 21a, a second touch pad 21b, a start button 21c, a select button 21d, an L button 21e, and an R button 21f. According to another embodiment, the controller 20 may wirelessly communicate with the game apparatus 14, that is, no communication cable is used in this case. The television set 12 and the speaker 50 are connected to the game apparatus 14 via an AV cable and the like. While FIG. 1 shows that the present example embodiment is realized as a stationary game apparatus, the present example embodiment can be realized as a portable game apparatus, an arcade game apparatus, an apparatus such as a mobile telephone or a personal computer capable of executing a program. Hereinafter, with reference to FIG. 2, respective components and a typical operation of the game system according to the present example embodiment will be described in detail.

The optical disc 16 such as a DVD-ROM is used as an example of an external storage medium. The optical disc 16 fixedly stores data, such as character data, relating to a game and a game program typifying a program of the present example embodiment. When a player plays a game, the optical disc 16 is mounted on the game apparatus 14. A means for storing the game program and the like is not restricted to a DVD-ROM. The means for storing the game program and the like may be a storage medium such as a CD-ROM, an MO, a memory card, or a ROM cartridge. Alternatively, a game program downloaded through communication may be stored in a storage means such as a memory or a hard disk incorporated in the game apparatus. The memory card 18 is, for example, a rewritable storage medium such as a flash memory. The memory card 18 stores data such as saved data for a game.

The game apparatus 14 reads the game program stored in the optical disc 16 so as to perform a game process. The controller 20 is an input device used for a player to make an input for game play. The controller 20 outputs operation data to the game apparatus 14 in accordance with the touch pad 21a or 21b being operated by the player, the operation button 21c, 21d, 21e, or 21f having been pressed by the player, or one of below-described switches (not shown) having been pressed by the player. The television set 12 displays, on a screen, image data outputted by the game apparatus 14. The speaker 50, which is typically incorporated in the television set 12, outputs sound for a game outputted by the game apparatus 14. When two or more players play the game, the number of the controllers 20 provided is the same as the number of the players.

As described above, the controller 20 has two touch pads, i.e., the touch pad 21a and the touch pad 21b, which are provided on the right side and the left side of the main surface thereof, respectively. The touch pads 21a and 21b have the same structure. In the following description, when it is unnecessary to discriminate between the touch pad 21a and the touch pad 21b, each of the touch pad 21a and the touch pad 21b is simply referred to as "touch pad 21". The touch pad 21 maybe of any one of a resistive film type, an optical (infrared) type, a capacitive coupling type or the like. When a player touches an input surface of the touch pad 21 with a finger or the like, the touch pad 21 outputs coordinate data (input coordinate data) corresponding to a touch position (input position). The touch pad 21 detects for the input position at intervals of a predetermined sampling time and outputs the input coordinate data. In this embodiment, the predetermined sampling time is the same as a frame time for screen display. As the touch pad 21, any touch pad operable to output the input coordinate data can be used. For example, the touch pad 21 may output, to the game apparatus 14, both the input coordinate data and data indicating an area in which the player is touching the input surface thereof with a finger or the like. The touch pad 21 may detect for and output a movement speed of the input position. Further, in the present embodiment, the touch pad 21 has its input surface supported by springs or the like so as to allow the input surface to be pressed, and the touch pad 21 has switches (not shown) on the underside thereof. The player can press the switches by pressing the input surface of the touch pad 21.

The aforementioned controller 20 is an example of the input device for use in the present example embodiment. As the input device, any input device which can act as a pointing device capable of detecting for the input position on the input surface at intervals of a predetermined sampling time, can be used. For example, the input device may have a single touch pad, or the input device may include a touch panel instead of the touch pad.

Next, a structure of the game apparatus 14 will be described. As shown in FIG. 2, the game apparatus 14 includes a CPU 22 and a memory controller 40 connected to the CPU 22. Further, in the game apparatus 14, the memory controller 40 is connected to a graphics processing unit (GPU) 24, a main memory 34, a digital signal processing circuit (DSP) 36, and various interfaces (I/Fs) 42 to 52. Via the DSP 36, the memory controller 40 is connected to a sub-memory 38. The memory controller 40 controls data transfer among the respective components.

At the start of a game, a disc drive 54 initially drives the optical disc 16 mounted on the game apparatus 14. The game program stored on the optical disc 16 is loaded to the main memory 34 via a disc I/F 52 and the memory controller 40. When the CPU 22 executes the program on the main memory 34, the game is started. After the game is started, a player makes an input to the controller 20 for game play using the touch pads 21a and 21b, the operation buttons 21c, 21d, 21e, and 21f, and the aforementioned switches. In accordance with the input having been made by the player, the controller 20 outputs operation data to the game apparatus 14. The operation data outputted by the controller 20 is inputted to the CPU 22 via a controller I/F 42 and the memory controller 40. The CPU 22 is operable to perform a game process in accordance with the operation data having been inputted thereto. When generating image data and the like during the game process, the GPU 24 and the DSP 36 are used. Further, the sub-memory 38 is used when the DSP 36 performs a predetermined process.

The GPU 24 includes a geometry unit 26 and a rendering unit 28, and is connected to a memory dedicated to image processing. The memory dedicated to image processing is used as, for example, a color buffer 30 and a Z buffer 32. The geometry unit 26 performs calculation for coordinates of a solid model of an object and a graphic in a game space representing a virtual three-dimensional space (for example, a solid model of an object of a polygon). For example, the geometry unit 26 rotates, enlarges, downsizes, and transforms the solid model, and further converts coordinates in a world coordinate system into coordinates in a viewpoint coordinate system or into coordinates in a screen coordinate system. The rendering unit 28 writes, for each pixel, color data (RGB data) of the solid model projected on the screen coordinate system into the color buffer 30 based on a predetermined texture, thereby generating a game image. Further, the color buffer 30 is a memory area allocated so as to store game image data (RGB data) generated by the rendering unit 28. The Z buffer 32 is a memory area allocated so as to store, when the three-dimensional viewpoint coordinates are converted into two-dimensional screen coordinates, information of the depth dimension as seen from the viewpoint. The GPU 24 generates image data to be displayed on the television set 12 using the geometry unit 26, the rendering unit 28, the color buffer 30, and the Z buffer 32, and outputs the generated image data to the television set 12 via the memory controller 40 and a video I/F 44 as necessary. Sound data generated by the CPU 22 at the execution of the game program is outputted from the memory controller 40 to the speaker 50 via an audio I/F 48. Although in the present embodiment the memory dedicated to image processing is provided, a UMA (Unified Memory Architecture) may be adopted in which a portion of the main memory 34 is used as a memory for image processing, for example. The game apparatus 14 transfers game data generated by executing the game program to the memory card 18 via the memory controller 40 and an external memory I/F 46. Further, the game apparatus 14 loads game data stored in the memory card 18 into the main memory 34 via the memory controller 40 and a memory I/F 46 before the game is started.

Next, a process executed by the game apparatus 14 using the program according to the present embodiment will be generally described. The game apparatus 14 calculates an operation vector based on an input to the touch pad 21 so as to perform a game process using the operation vector. The operation vector represents, as a vector, an input to the touch pad 21 made by the player. Specifically, the operation vector represents a vector starting at a position of a reference point set on the input surface and ending at a position (input position) at which the player has made an input on the input surface. The game apparatus 14 determines, based on the operation vector, an operation performed by the player, so as to perform a game process in accordance with the operation performed by the player.

In the present embodiment, a game in which a player character appears in a game space will be described as an example. In the following description, the game apparatus 14 performs a process of moving the player character in the game space in accordance with a player's operation, as an example of the game process. Specifically, the game apparatus 14 moves the player character in a direction corresponding to a direction of the operation vector at a speed corresponding to a magnitude of the operation vector. By using such an operation vector for the game process, the player can feel as if he or she is operating a joystick while operating the touch pad. Any process can be performed by using the operation vector. For example, by using the operation vector, a process of moving a cursor displayed on the screen of the television set 12 may be performed.

Figure 3:
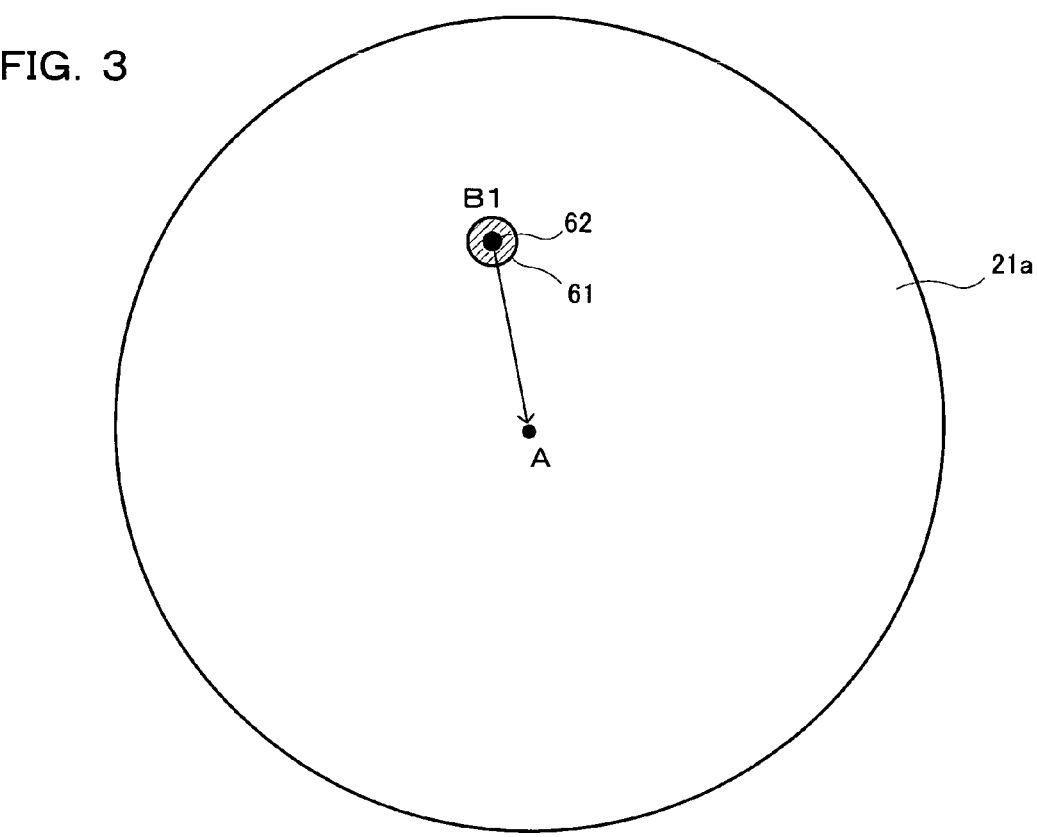
FIG. 3 is a diagram illustrating a state of a touch pad 21 at time t0.

With reference to FIGS. 3 to 6, a process of calculating the operation vector based on the input to the touch pad 21 will be described. In the following description, the player continuously makes a series of inputs to the touch pad 21. FIG. 3 is a diagram illustrating a state of the touch pad 21 at time t0. Here, the touch pad 21 initially detects an input at time t0. In FIGS. 3 to 6, a point A represents the center of the circular touch pad. The touch area 61 represents an area in which the player touches the touch pad 21 with a finger or the like. The touch pad 21 outputs the input coordinate data representing a position of a predetermined point (typically, the center of gravity of the touch area 61) within the touch area 61. Here, the input coordinate data representing a position of a point B1 is outputted. That is, the touch pad 21 detects the position of the point B1 as an initial input position at time t0. At this time, the game apparatus 14 sets, as a reference point 62, the input position (that is, the position of the point B1) having been initially detected by the touch pad 21. Therefore, the operation vector has a value 0 at time t0. As a result, in the game process performed using the operation vector, the player character is not moved.

Figure 4:
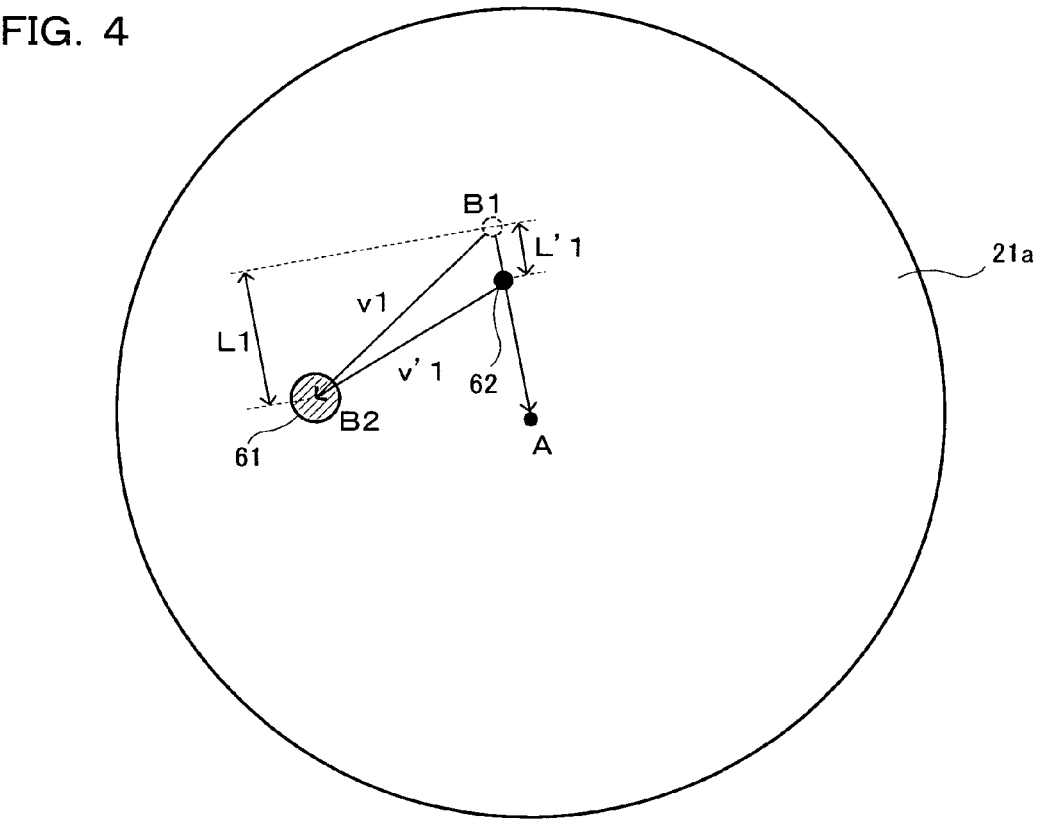
FIG. 4 is a diagram illustrating a state of the touch pad 21 at time (t0+t)

FIG. 4 is a diagram illustrating a state of the touch pad 21 at time (time: t0+t) at which a sampling time t has passed since time t0 in FIG. 3. Here, the predetermined point of the touch area 61 has been moved to a position of a point B2, so that the touch pad 21 outputs the input coordinate data representing the position of the point B2 at time (t0+t). At this time, the game apparatus 14 moves the reference point 62 from the position of the current reference point 62 over a distance L'1 toward the center point A (that is, in the direction of the center) In FIGS. 4 and 5, the reference point having not been moved is indicated by dotted-lines and the reference point 62 having been moved is indicated by a black circle. Hereinafter, a method for calculating the moving distance L'1 of the reference point will be described.

Initially, the game apparatus 14 calculates a vector (vector v1) ending at a current input position (point B2) and starting from the input position (point B1) having been detected in an immediately preceding time. The vector represents a moving direction and a moving distance of the input position. Hereinafter, the vector is referred to as a motion vector. In other words, the motion vector represents a movement speed of the input position detected at intervals of a sampling time. When the motion vector is calculated, the game apparatus 14 calculates a component L1 of the motion vector v1 in the direction of the center. Further, a moving distance L'1 is calculated by multiplying, by a predetermined adjustment value, the component L1 of the motion vector v1 in the direction of the center. The predetermined adjustment value is a predetermined constant. Therefore, the moving distance L'1 is proportional to the component L1 of the motion vector in the direction of the center.

As shown in FIG. 4, when the reference point 62 is moved, the game apparatus 14 calculates the operation vector based on a position of the reference point 62 having been moved and the current input position (point B2). That is, the operation vector is represented as a vector v'1 starting from the reference point 62 and ending at the point B2. The game apparatus 14 performs a game process for moving the player character based on the operation vector v'1.

Figure 5:
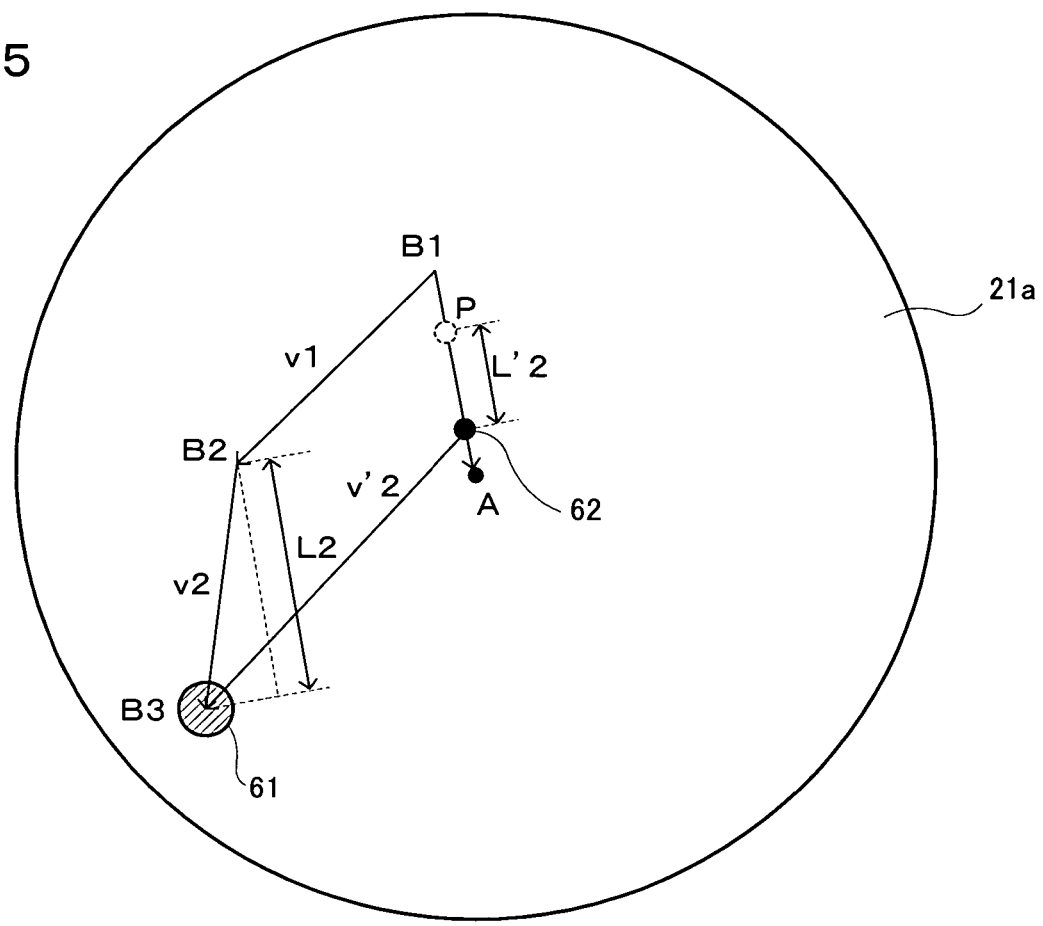
FIG. 5 is a diagram illustrating a state of the touch pad 21 at time (t0+2t)

FIG. 5 is a diagram illustrating a state of the touch pad 21 at time (time: t0+2t) at which the sampling time t has passed since time (t0+t) in FIG. 4. Also at time (t0+2t), the same calculation as described with reference to FIG. 4 is performed so as to move the reference point 62, thereby calculating the operation vector. That is, a motion vector v2 ending at a current input position (point B3) and starting from the input position (point B2) having been detected in the immediately preceding time is calculated, and a component L2 of the motion vector v2 in the direction of the center is calculated. Further, the component L2 of the motion vector in the direction of the center is multiplied by the adjustment value, thereby calculating a moving distance L'2. Therefore, the reference point 62 is moved over the moving distance L'2 in the direction of the center. Further, the operation vector is represented as a vector v'2 starting from the reference point 62 and ending at the current input position (point B3). The game process for moving the player character is performed based on the operation vector v'2.

Also after time (t0+2t), the reference point is moved in the direction of the center each time a new input position is detected in the same manner as described above. The reference point is repeatedly moved, and once the reference point reaches the center point A, the reference point is no longer moved. Further, when the reference point is to be moved beyond the center point A, that is, when the moving distance having been calculated is longer than a distance from the reference point to the center point A, the reference point is moved to the center point A and is stopped at the center point A. After that, the reference point is no longer moved As described above, according to the present embodiment, an initial position of the reference point is set to a position at which the player makes an initial input. Therefore, the operation vector has a value 0 immediately after the player has made the input, so that the player character is not moved at this time. Accordingly, the player character is not moved when the player intends to just touch the center of the touch pad 21 at the start of the game, thereby enhancing controllability of the touch pad. Further, the reference point approaches the center point A in accordance with the movement of the input position by the player until the reference point eventually reaches the center point A. Accordingly, although the reference point is initially offset from the center of the touch pad 21, the reference point is moved toward the center of the touch pad 21 while the player is playing the game. Therefore, it is possible to prevent the degradation in controllability resulting from the reference point being disposed in an unbalanced manner. In another embodiment, the game apparatus 14 may not necessarily execute the process of moving the reference point. That is, once the reference point is set to the position at which the player has made an initial input, the reference point may not be moved.

Figure 6:
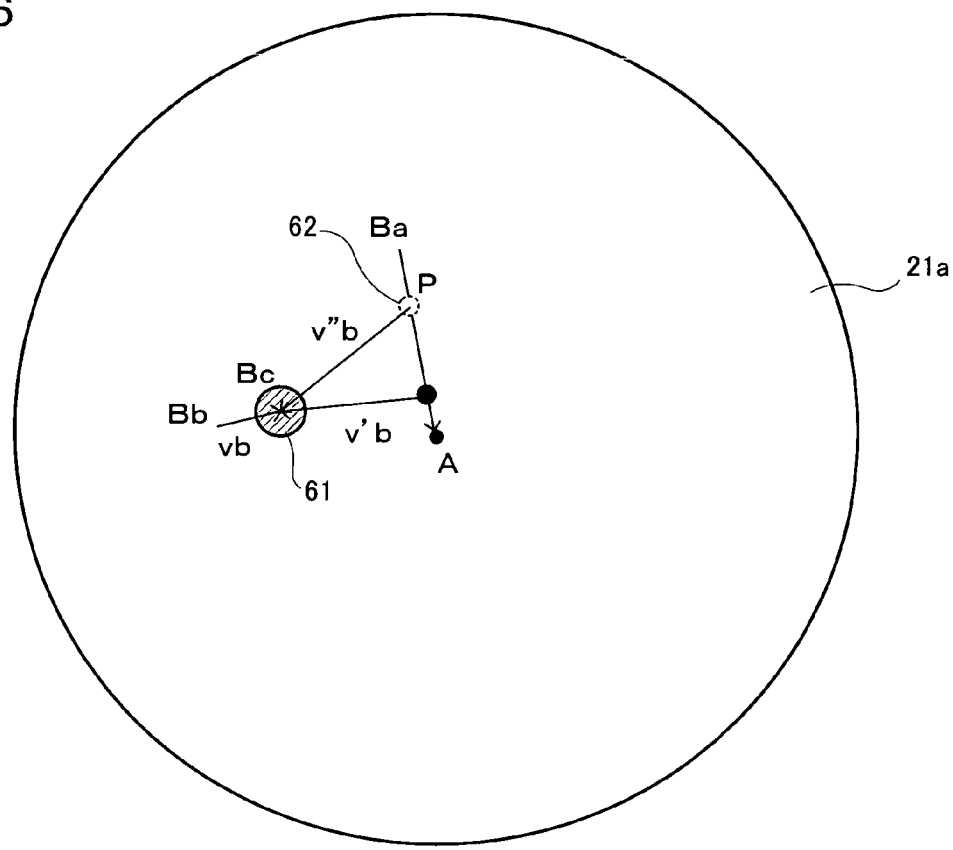
FIG. 6 is a diagram illustrating an operation vector obtained when a motion vector is substantially perpendicular to the direction of the center.

According to the present embodiment, the reference point is moved while the player is playing the game, so that the player may sometimes feel that an actual operation performed in the game process cannot be necessarily controlled as intended. FIG. 6 is a diagram illustrating the operation vector obtained when the motion vector is substantially perpendicular to the direction of the center. When the state of the touch pad 21 is as shown in FIG. 6, although the operation vector actually used in the game process is a vector v'b, the player feels that the operation is performed as if a vector v"b starting from the reference point 62 (dotted lines) having not been moved and ending at a point Bb is used as the operation vector. If a difference between the vector v"b and the vector v'b is too large, the player may be confused because the player cannot actually control the game operation performed in the game process as intended. In order to prevent confusing the player, the moving distance over which the reference point is moved for each input can be reduced. However, when the moving distance over which the reference point is moved for each input is simply reduced, a time required for the reference point to reach the center position is extended, so that the degradation in controllability resulting from the reference point being disposed in the unbalanced manner cannot be sufficiently prevented.

Figure 7:
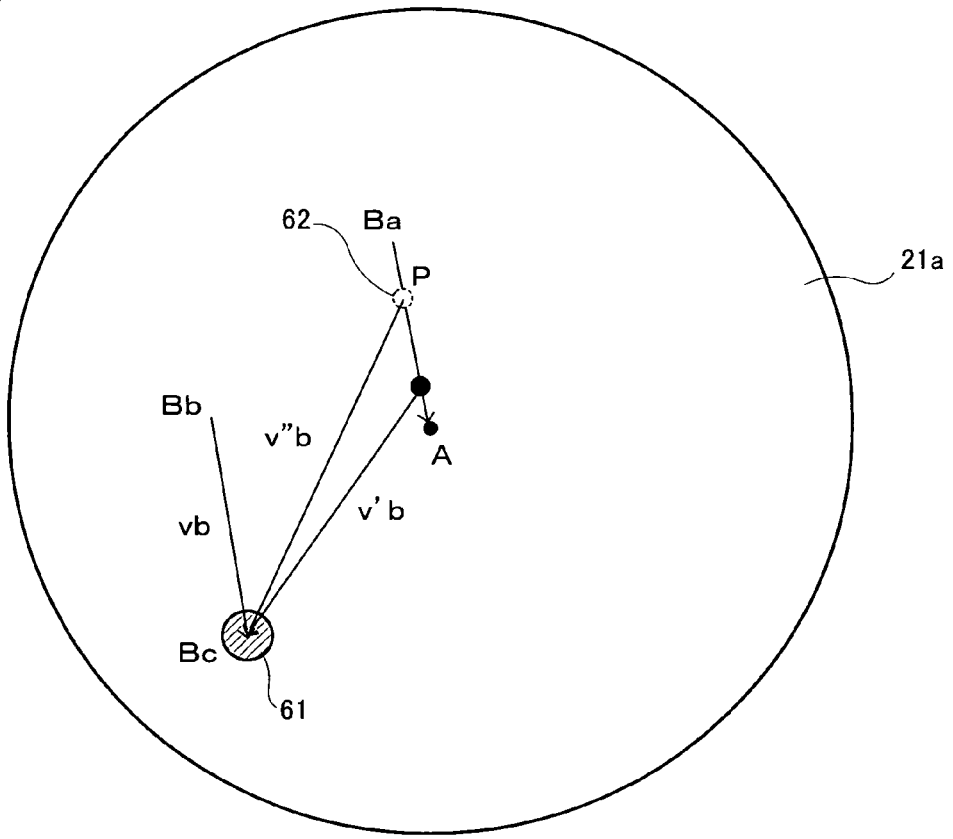
FIG. 7 is a diagram illustrating an operation vector obtained when the motion vector is substantially parallel to the direction of the center.

When a component of the motion vector in the direction of the center is large, the player is not likely to be confused even if the reference point is moved in the direction of the center. FIG. 7 is a diagram illustrating the operation vector obtained when the motion vector is substantially parallel to the direction of the center. As shown in FIG. 7, when the component of the motion vector in the direction of the center is large, a difference between a direction of the vector V"B and a direction of the vector V'B is not large even if the reference point is moved toward the center over a certain distance. That is, in this case, even when the reference point is moved toward the center over a certain distance, the player is not likely to be confused. On the other hand, as shown in FIG. 6, when the reference point is moved toward the center over a long distance in the case of the component of the motion vector in the direction of the center being small, the difference between the direction of the vector V"b and the direction of the vector V'b is large, whereby the player is highly likely to be confused.

In the present embodiment, the moving distance over which the reference point is moved for each input is determined depending on a magnitude of the component of the motion vector in the direction of the center. That is, when the magnitude of the component of the motion vector in the direction of the center is large, the player is not likely to be confused, and therefore the moving distance of the reference point is increased. On the other hand, when the magnitude of the component of the motion vector in the direction of the center is small, the player is likely to be confused, and therefore the moving distance of the reference point is reduced. Therefore, in the present embodiment, the reference point can be effectively moved toward the center of the touch pad 21 without confusing the player. Accordingly, according to the present embodiment, the player can be substantially prevented from being confused about an actual operation performed in the game process being not necessarily controlled as intended, and the degradation in controllability resulting from the reference point being disposed in the unbalanced manner can be effectively prevented.

Figure 8:
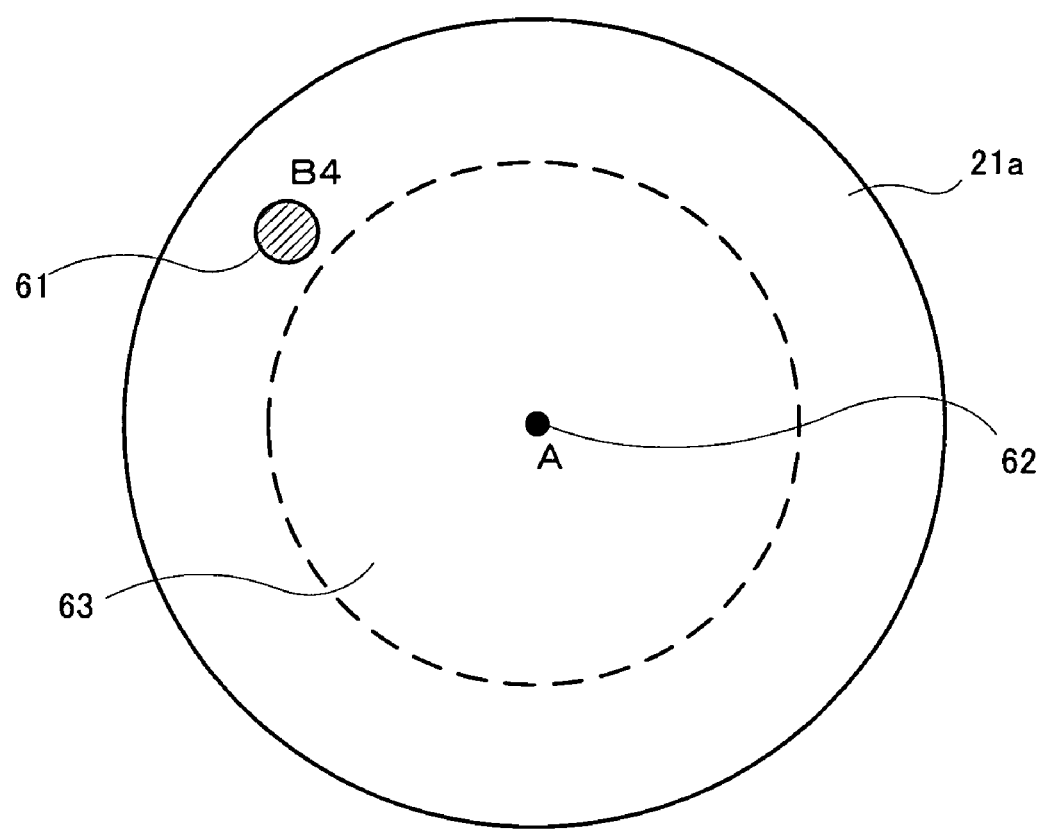
FIG. 8 is a diagram illustrating a determination area set on an input surface of the touch pad 21.

Further, according to the present embodiment, a determination area is set on the input surface of the touch pad 21. The determination area is an area around a point (that is, the center point A) representing a final destination of the reference point. FIG. 8 is a diagram illustrating the determination area set on the input surface of the touch pad 21. In FIG. 8, an area surrounded by dotted lines is the determination area 63. As shown in FIG. 8, the determination area 63 is a circular area having the center point A at the center thereof. When the input position (initial input position) which is initially detected by the touch pad 21 is within the determination area 63, the game apparatus 14 sets the reference point to the initial input position as shown in FIG. 3. On the other hand, when the initial input position is outside the determination area 63, the game apparatus 14 sets the reference point to a position of the center point A. For example, as shown in FIG. 8, when the initial input position is a point B4, the reference point 62 is set to the position of the center point A.

Here, depending on a game to be played or a progress state of the game, the player may not desire to initially touch the center point A. For example, when the player desires to slowly move the player character at the start and gradually move the player character fast, the player will desire to initially touch the position of the center point A. On the other hand, when the player desires to move the player character at a high speed from the beginning, the player will not initially touch the position of the center point A.

According to the present embodiment, the determination area 63 is set so as to determine whether the player intends to touch the position of the center point A or another position. Specifically, when the player initially touches a position outside the determination area 63, it is determined that the player intends to move the player character, that is, the player does not intend to touch the center point A. Therefore, in this case, the game apparatus 14 sets the reference point to the position of the center point A. On the other hand, when the player initially touches a position within the determination area 63, it is determined that the player does not intend to move the player character at a high speed from the beginning, that is, the player intends to touch the center point A. Accordingly, in this case, the game apparatus 14 sets the reference point to the initial input position. Thus, the determination area 63 is set so as to identify an operation performed by the player who intends to touch a position other than the center point A, thereby improving the controllability.

Figure 9:
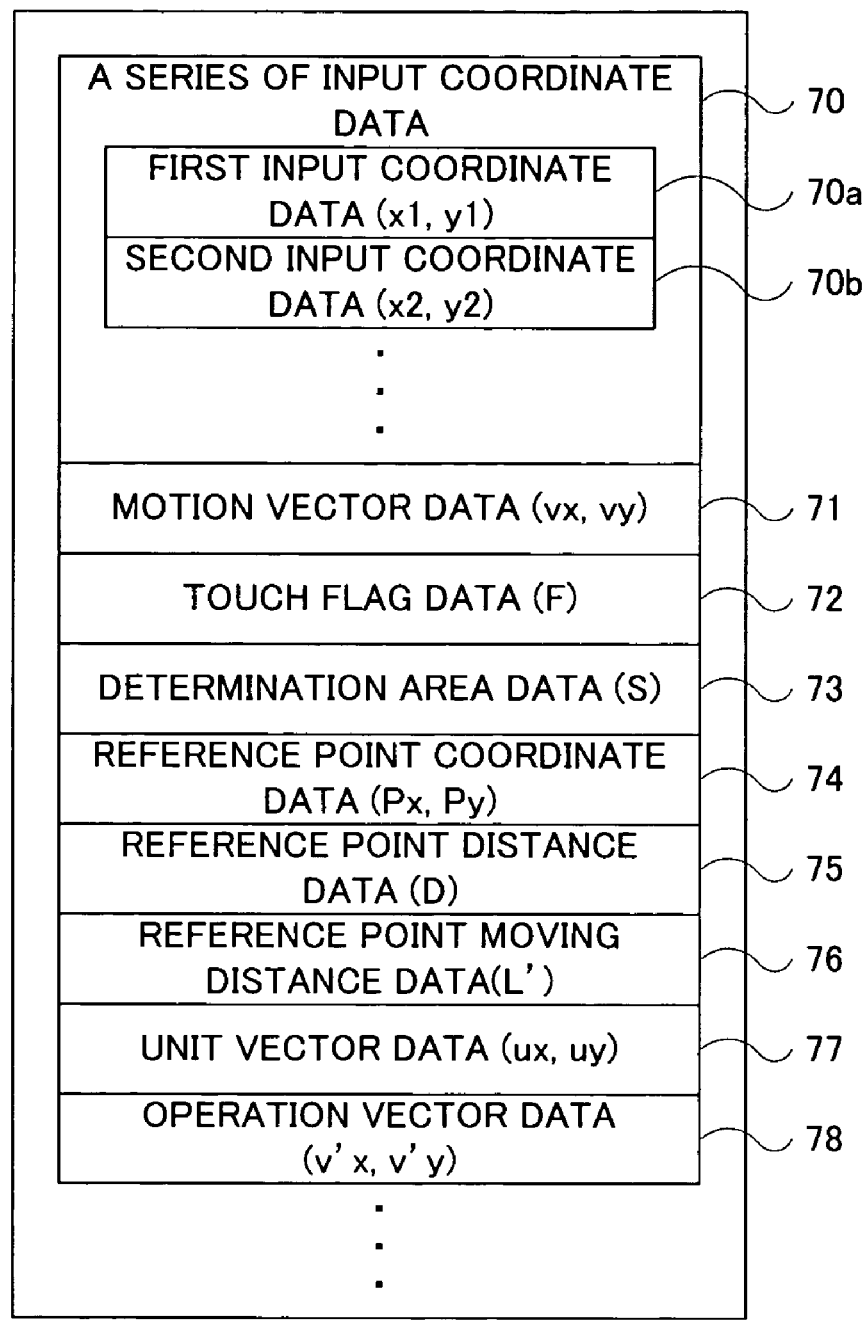
FIG. 9 is a diagram illustrating main data stored in a main memory 34 of a game apparatus 14.

Next, the game process performed by the game apparatus 14 executing a game program will be described in detail. Initially, main data used for the game process will be described with reference to FIG. 9. FIG. 9 is a diagram illustrating main data stored in the main memory 34 of the game apparatus 14. As shown in FIG. 9, the main memory 34 stores data such as: a series of input coordinate data 70; motion vector data 71; touch flag data 72; determination area data 73; reference point coordinate data 74; reference point distance data 75; moving distance data 76; unit vector data 77; and operation vector data 78. The main memory 34 stores data necessary for the game process, other than the data shown in FIG. 9, such as data relating to the player character (image data, position data and the like of the player character), and data relating to a game space (for example, topography data).

A series of input coordinate data 70 is a collection of input coordinate data indicating the respective input positions which are continuously detected by the touch pad 21. In the present embodiment, the input coordinate data indicating input positions which are detected during a series of inputs continuously made by the player as a single input operation are chronologically added to the series of input coordinate data 70 in order of the detection. Therefore, the input coordinate data indicating an initial input position is stored in the main memory 34 as first input coordinate data 70a, and the input coordinate data indicating an input position obtained through the second detection is stored in the main memory 34 as second input coordinate data 70b. Here, coordinates stored as the n-th input coordinate data indicating an input position obtained through the n-th (n is an integer greater than or equal to one) detection are represented as (x(n), y(n)). Further, in the present embodiment, the coordinates (x(n), y(n)) are based on Cartesian coordinate system in which a predetermined position (for example, the center point) on the input surface of the touch pad 21 is set as an originating point. When the series of inputs continuously made as a single input operation is finished (that is, a finger is removed from the touch pad 21) and another series of inputs is started, data which have been stored as the series of input coordinate data 70 are erased and input coordinate data obtained through new inputs are chronologically stored as the series of input coordinate data 70.

The motion vector data 71 represents the aforementioned motion vector. In the present embodiment, as the motion vector data 71, only data representing a motion vector having been most recently detected is stored in the main memory. That is, when the motion vector is newly calculated, the motion vector data 71 has its data updated to data representing the motion vector having been newly calculated. Here, the motion vector data is represented as (vx, vy).

The touch flag data 72 represents a flag indicating whether or not an input to the touch pad 21 has been made. Specifically, when an input to the touch pad 21 has been made, the flag has its value set to "1", and when no input is made to the touch pad 21, the flag has its value set to "0".

The determination area data 73 represents the aforementioned determination area. Here, the determination area is a circular area having the aforementioned center point at the center thereof, and data representing a length L of a radius of the determination area is stored as the determination area data 73. The length L of the radius of the determination area is previously set in the game program.

The reference point coordinate data 74 represents a position of the reference point. Here, coordinates stored as the reference point coordinate data 74 are represented as (Px, Py). The coordinates (Px, Py) are based on the same coordinate system as that of coordinates represented by the input coordinate data. Further, the reference point distance data 75 represents a distance D from the reference point to the center point. The moving distance data 76 represents the aforementioned moving distance L' of the reference point.

The unit vector data 77 represents a vector (unit vector) which has a unit length and points in the direction of the center point from the reference point. That is, the unit vector points in the direction of the center. Here, coordinates stored as the unit vector data 77 are represented as (ux, uy). Further, the operation vector data 78 represents the aforementioned operation vector. Here, the operation vector is represented as (v'x, v'y).

Figure 10:
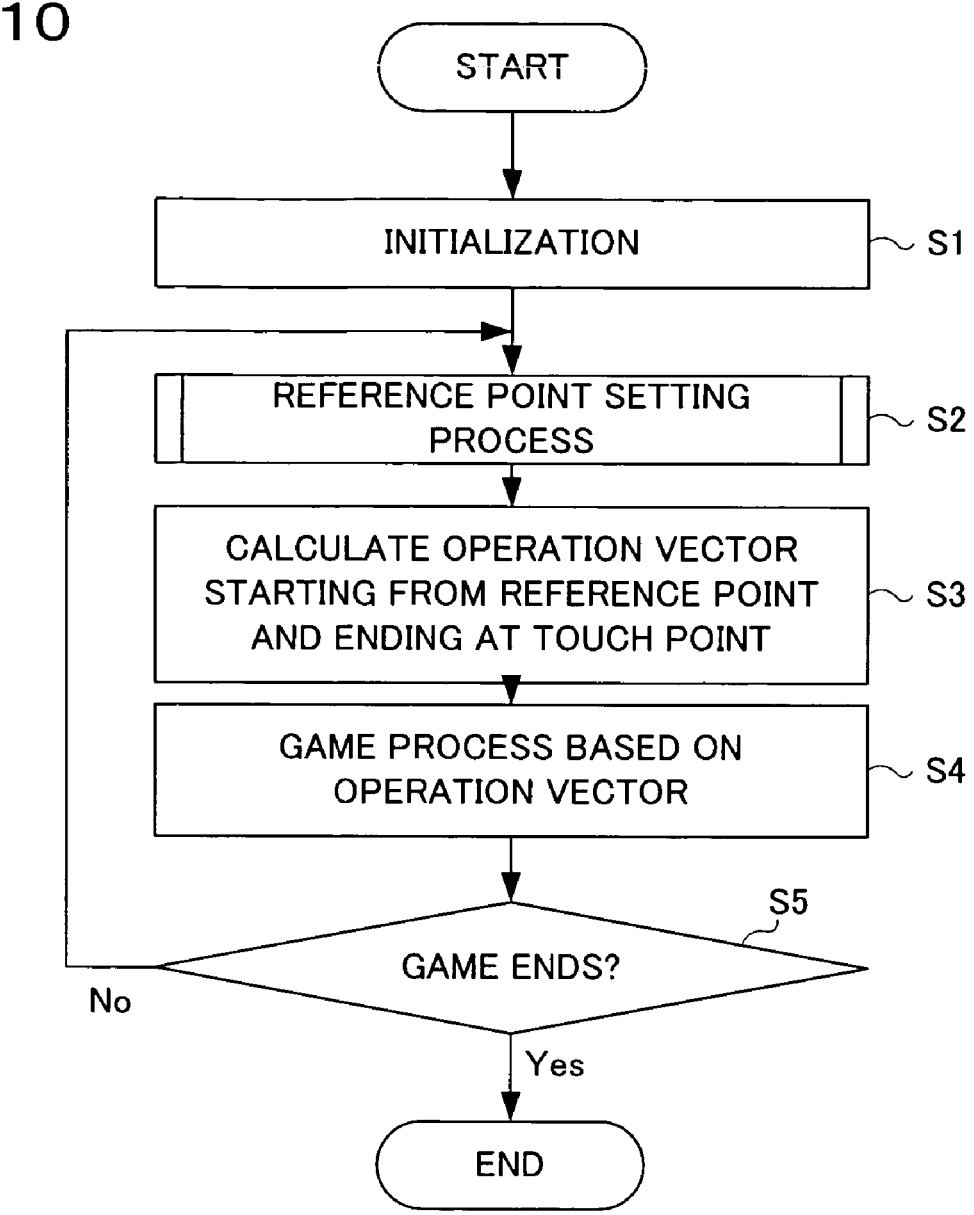
FIG. 10 is a flow chart illustrating a flow of a game process performed by the game apparatus 14.
Figure 11:
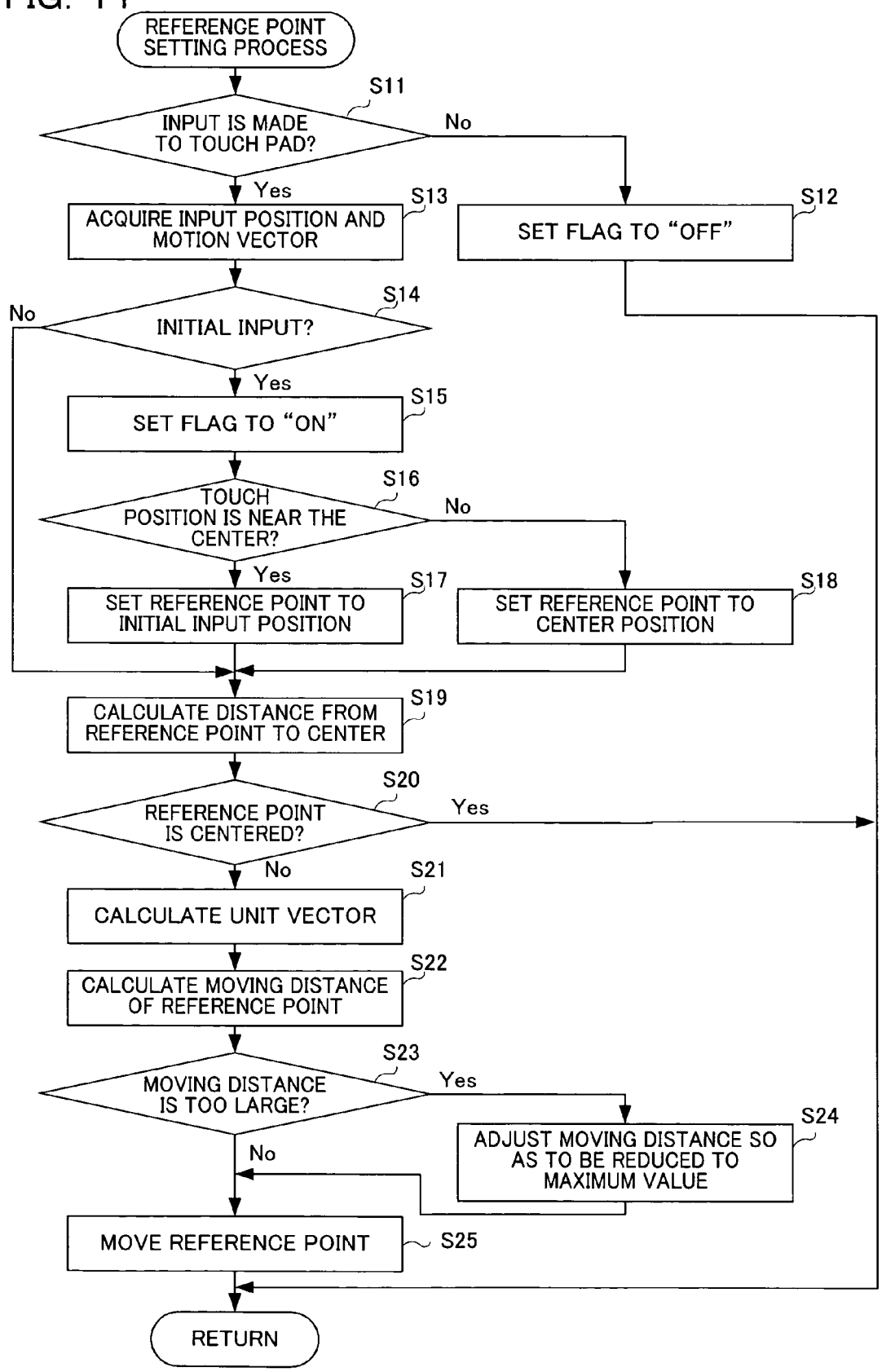
FIG. 11 is a flow chart illustrating in detail a process flow of step S2 shown in FIG. 10.

Next, with reference to FIGS. 10 and 11, the game process performed by the game apparatus 14 executing the game program will be described in detail. FIG. 10 is a flow chart illustrating a flow of the game process performed by the game apparatus 14. When the game apparatus 14 is powered on, the CPU 22 of the game apparatus 14 executes a boot program stored in a boot ROM not shown, so as to initialize the respective units such as the main memory 34. The game program stored in the optical disc 16 is loaded to the main memory 34, and the CPU 22 starts execution of the game program. The flow chart of FIG. 10 illustrates the game process performed after the aforementioned processes are completed. In FIGS. 10 and 11, among the entire game process, a process of calculating the aforementioned operation vector based on an input to the touch pad 21 will be described in detail, and other game processes, which are not directly relevant to the present example embodiment, are not described in detail.

In step S1 of FIG. 10, initialization is performed. Specifically, predetermined initial values are stored in the main memory 34 so as to assign the respective predetermined initial values to data requiring the initial values. For example, data representing the length L of the radius of the determination area is stored as the determination area data 73. Further, the touch flag has its value set to "0". Further, in step S1, a game space is generated, and characters such as a player character and the like to appear in the game space are disposed in the game space, thereby displaying the initialized game space on the television set 12.

In step S2 following step S1, a reference point setting process is performed. In the reference point setting process, an input to the touch pad 21 is received and the reference point used for calculating the operation vector is set. Hereinafter, with reference to FIG. 11, the reference point setting process will be described in detail.

FIG. 11 is a flow chart illustrating in detail a process flow of step S2 shown in FIG. 10. In the reference point setting process, it is determined in step S11 whether or not an input to the touch panel 12 has been made. Specifically, the CPU 22 is operable to read data outputted by the touch pad 21 and determine whether or not input coordinate data is being outputted by the touch pad 21. When input coordinate data is being outputted by the touch pad 21, it is determined that an input to the touch pad 21 is made, and the process advances to step S13. On the other hand, when the touch pad 21 outputs data indicating that no input is being made, it is determined that no input is being made to the touch pad 21, and the process advances to step S12.

In step S12, the touch flag is set to OFF. That is, the CPU 22 is operable to set, to "0", the value of the touch flag data 72 stored in the main memory 34. Following step S12, the CPU 22 ends the reference point setting process.

On the other hand, in step S13, an input position on the touch pad 21 and a motion vector are acquired. Specifically, the CPU 22 is operable to add, to the series of input coordinate data 70 stored in the main memory 34, the input coordinate data having been read from the touch pad 21 in step S11. Further, the CPU 22 is operable to calculate the motion vector ending at a position represented by the current input coordinate data and starting from a position represented by the input coordinate data having been added, in an immediately preceding time, to the series of input coordinate data 70 stored in the main memory 34. More specifically, the motion vector (vx(m), vy(m)) is calculated using the following equation (1).

$$vx(m)=x(m)-x(n) \quad vy(m)=y(m)-y(n) \tag{1}$$

where (x(n), y(n)) are coordinates represented by the n-th (n is an integer greater than or equal to one) input coordinate data, and (x(m), y(m)) are coordinates represented by the m-th (m=n+1) input coordinate data. When the touch pad 21 can calculate the motion vector, the CPU 22 reads data of the motion vector outputted by the touch pad 21 without doing the calculation using equation (1). The motion vector data 71 has its data updated to the data representing the motion vector having been calculated and the updated motion vector data 71 is stored in the main memory 34. That is, the motion vector data having been calculated in the immediately preceding time is updated to the motion vector data having been newly calculated, and the updated motion vector data is stored.

Following step S13, it is determined in step S14 whether or not the input detected in step S13 is an initial input, that is, it is determined in step S14 whether or not the input position acquired in step S13 is an initial input position. Here, the initial input position represents an input position which is initially detected when the touch pad 21 continuously detects for a series of input positions as described above. The CPU 22 is operable to perform the determination process of step S14 based on the value of the touch flag. That is, when the value of the touch flag data 72 stored in the main memory 34 is "0", it is determined that the input position acquired in step S13 is the initial input position. In this case, the process advances to step S15. On the other hand, when the value of the touch flag data 72 stored in the main memory 34 is "1", it is determined that the input position acquired in step S13 is not the initial input position. In this case, the processes of steps S15 to S18 are skipped, and the process advances to step S19.

In step S15, the touch flag is set to "ON". That is, the CPU 22 is operable to set, to "1", the value of the touch flag data 72 stored in the main memory 34. In the following step S16, it is determined whether or not the touch position having been initially inputted is near the center of the input surface, that is, it is determined whether or not the initial input position is within the determination area. The determination of step S16 is performed based on the determination area data 73 and the input coordinate data (the most recent input coordinate data)

having been finally stored in the main memory 34. That is, the CPU 22 is operable to determine whether or not the coordinate position represented by the most recent input coordinate data is within the area defined by the determination area data 73. Specifically, it is determined that the initial input position is within the determination area when the following equation (2) is satisfied.

$$((x(n))^2+(y(n))^2)^{1/2} \leq L \qquad (2)$$

where (x(n), y(n)) (n is an integer greater than or equal to one) are coordinates represented by the most recent input coordinate data and L represents a radius of the determination area.

When it is determined in step S16 that the initial input position is within the determination area, the process advances to step S17. Instep S17, the reference point is set to the initial input position (see FIG. 3). Specifically, the CPU 22 is operable to store, in the main memory 34, the input position represented by the input coordinate data having been finally stored in step S13 as the reference point coordinate data 74. On the other hand, when it is determined in step S16 that the initial input position is outside the determination area, the process advances to step S18. That is, in step S18, the reference point is set to the position of the center point (see FIG. 8). Specifically, the CPU 22 is operable to store data representing coordinates (0, 0) of the center point as the reference point coordinate data 74 in the main memory 34. Following step S17 or S18, the process advances to step S19.

In step S19, the distance D from the reference point to the center point is calculated. Specifically, the CPU 22 is operable to calculate the distance D using the reference point coordinate data 74 stored in the main memory 34 in accordance with the following equation (3).

$$D=(px^2+py^2)^{1/2} \qquad (3)$$

where (Px, Py) represents coordinates of the reference point. The reference point distance data 75 has its data updated to the data representing the distance D having been calculated in step S19, and the updated reference point distance data 75 is stored in the main memory 34.

Following step S19, it is determined in step S20 whether or not the reference point coincides with the center point. The determination of step S20 can be performed based on the reference point coordinate data 74. That is, when coordinates (Px, Py) represented by the reference point coordinate data 74 are (0, 0), it is determined that the reference point coincides with the center point. When it is determined that the reference point does not coincide with the center point, steps S21 to S25 are performed. In steps S21 to S25, the reference point is moved. On the other hand, when it is determined that the reference point coincides with the center point, steps S21 to S25 are skipped and the CPU 22 ends the reference point setting process shown in FIG. 11.

In step S21, the unit vector is calculated. The unit vector represents a vector which has a unit length and points in the direction of the center point from the reference point as described above. The CPU 22 is operable to calculate the unit vector (ux, uy) using the distance D and the position coordinates (Px, Py) of the reference point in accordance with the following equation (4).

$$ux=Px \div D \ uy=Py \div D \qquad (4)$$

Data represented by the unit vector having been calculated in accordance with the equation (4) is stored as the unit vector data 77 in the main memory 34.

Following step S21, the moving distance L' of the reference point is calculated in step S22. As described above, the moving distance L' is calculated by multiplying a component of the motion vector in the direction of the center by a predetermined adjustment value. That is, the CPU 22 is operable to calculate the moving distance L' using the motion vector data 71 and the unit vector data 77. Specifically, the moving distance L' is calculated using the following equation (5).

$$L'=|u \cdot v| \times A \qquad (5)$$

where v represents the motion vector, u represents the unit vector and A represents the adjustment value. As shown in equation (5), an inner product of the unit vector and the motion vector is multiplied by the adjustment value A so as to obtain the moving distance L'. Data representing the moving distance L' having been calculated is stored as the moving distance data 76 in the main memory 34.

The adjustment value A is previously set in the game program. By changing the adjustment value A, a time period required for the reference point to reach the center point can be changed. That is, when the adjustment value A is increased, the time required for the reference point to reach the center point is reduced, and when the adjustment value A is reduced, the time required for the reference point to reach the center point is extended.

Following step S22, it is determined in step S23 whether or not the moving distance L' having been calculated in step S22 is too long. Specifically, the CPU 22 is operable to determine whether or not the moving distance L' is longer than the aforementioned distance D based on the reference point distance data 75 and the moving distance data 76. When it is determined in step S22 that the moving distance L' is longer than the distance D (that is, the moving distance L' is too long), the process advances to step S24. That is, in step S24, the moving distance L' is adjusted so as to be reduced to a maximum value corresponding to the distance D. Specifically, the CPU 22 is operable to update, to the distance D, the data represented by the moving distance data 76 stored in the main memory 34. Following step S24, the process advances to step S25. On the other hand, when it is determined in step S22 that the moving distance L' is shorter than the distance D, step S24 is skipped and the process advances to step S25.

In step S25, the reference point is moved. At this time, the reference point is moved in the direction of the center over the moving distance having been calculated in step S22 or the moving distance having been adjusted in step S24 (see FIGS. 4 and 5). Specifically, the CPU 22 is operable to calculate a new position of the reference point based on the reference point coordinate data 74, the moving distance data 76, and the unit vector data 77. Coordinates (Px, Py) of the reference point having been moved are calculated using the following equation (6).

$$Px=Px'-ux \times L' \ Py=Py'-uy \times L' \qquad (6)$$

where (Px', Py') represent coordinates of the reference point having not been moved, (ux, uy) represent the unit vector, and L' represents the moving distance. The CPU 22 is operable to update the data represented by the reference point coordinate data 74 stored in the main memory 34 to data representing coordinates having been calculated using equation (6), and store the updated reference point coordinate data 74. Following step S25, the CPU 22 ends the reference point setting process.

Returning to FIG. 10, the process advances to step S3 following the reference point setting process of step S2. That is, in step S3, the operation vector is calculated. The operation vector is calculated based on the reference point coordinate data 74 and the most recent input coordinate data. Specifically, the operation vector (v'x, v'y) is calculated using the following equation (7).

$$v'x = x(n) - Px \quad v'y = y(n) - Py \quad (7)$$

where (Px, Py) represent the coordinates of the reference point and (x(n), y(n)) (n is an integer greater than or equal to one) represent the coordinates of the most recent input position. The CPU 22 is operable to update data represented by the operation vector data 78 stored in the main memory 34 to data representing the operation vector having been calculated using equation (7), and store the updated operation vector data 78.

In step S4 following step S3, a game process is performed in accordance with the operation vector having been calculated in step S3. In the present embodiment, the game process such as a process of moving a player character appearing in the game space is performed. Specifically, the player character is moved at a speed corresponding to a magnitude of the operation vector in the direction corresponding to the direction of the operation vector. In the following step S5, it is determined whether or not the game is to be ended. For example, it is determined whether or not the player has performed a predetermined game end operation. When it is determined that the game is to be ended, the CPU 22 ends the game process shown in FIG. 10. On the other hand, when it is determined that the game is not to be ended, the process returns to step S2, and thereafter processes of steps S2 to S5 are repeated until it is determined that the game is to be ended.

In the process described above, an initial position of the reference point is set to a position at which the player makes an initial input, and therefore the player character is not moved immediately after the player has made the input. Accordingly, the player character is prevented from being moved against the player's intention, thereby enhancing the controllability of the touch pad. Further, the reference point is moved toward the center point A in accordance with the input position being moved by the player until the reference point eventually reaches the center point A. Accordingly, the touch pad can be prevented from having its controllability degraded due to the reference point being kept disposed in an unbalanced manner.

In the present embodiment, the game apparatus calculates the moving distance of the reference point based on the magnitude of the component of the motion vector in the direction of the center. In another embodiment, however, the game apparatus may use any algorithm for enabling the reference point to be moved toward the center position. For example, as shown in FIGS. 12 and 13, the moving distance of the reference point may be calculated based on the direction of the motion vector.

Figure 12:
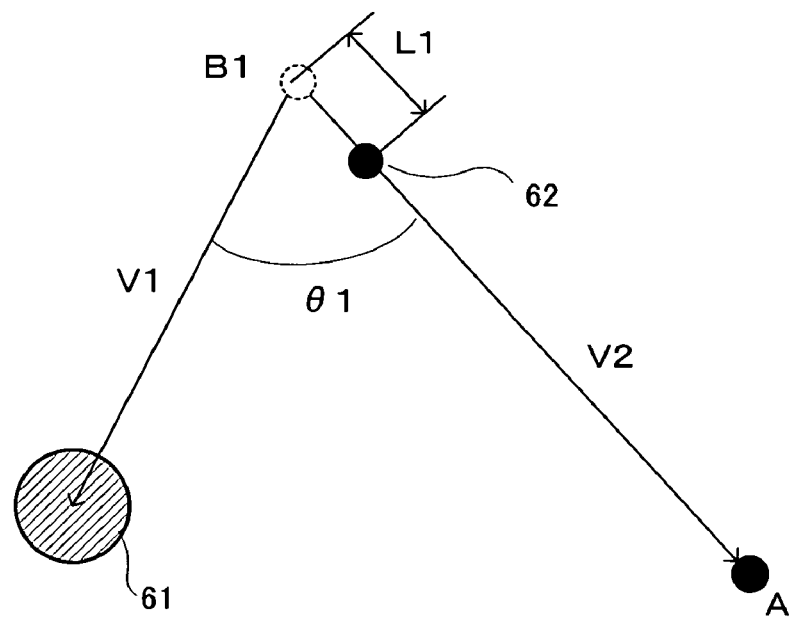
FIG. 12 is a diagram illustrating a method for calculating a moving distance of a reference point according to another embodiment.
Figure 13:
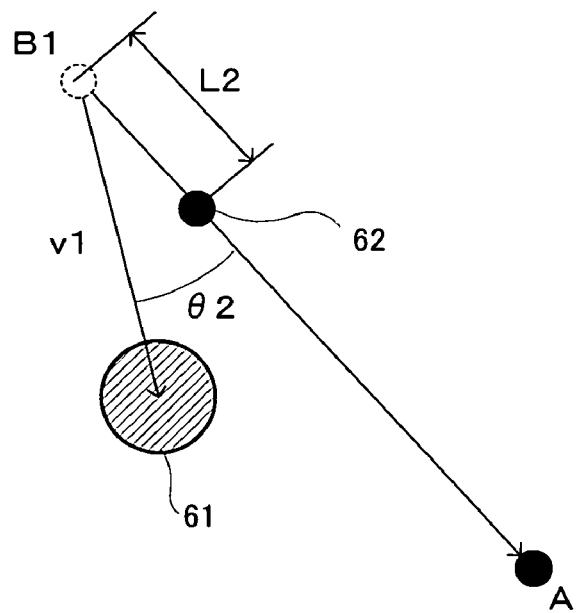
FIG. 13 is a diagram illustrating a method for calculating the moving distance of the reference point according to another embodiment.

FIGS. 12 and 13 are diagrams illustrating a method for calculating the moving distance of the reference point according to another embodiment. In FIG. 12, θ1 represents an angle between a motion vector V1 and a vector V2 starting from the reference point 62 and ending at the center point A, and L1 represents the moving distance of the reference point 62. Further, in FIG. 13, θ2 represents an angle between the motion vector V1 and the vector V2, and L2 represents the moving distance of the reference point 62. As shown in FIGS. 12 and 13, the moving distance of the reference point may be changed in accordance with the angle between the motion vector V1 and the vector V2. Specifically, in step S22 shown in FIG. 11, the moving distance may be calculated such that the larger the angle between the motion vector V1 and the vector V2 is, the longer the moving distance of the reference point is. As another method for calculating the moving distance of the reference point based on the direction of the motion vector, considered is a method for moving the reference point only when the angle between the motion vector V1 and the vector V2 is larger than a predetermined angle. Also, when the method for moving the reference point as shown in FIGS. 12 and 13 is used, the player can be prevented from being confused due to an operation performed in the game process being not controlled as intended, as in the aforementioned embodiment. However, since the magnitude of the motion vector is not used in the method for moving the reference point as shown in FIGS. 12 and 13, the player may be more confused about the controllability than in the aforementioned embodiment.

Moreover, in still another embodiment, the moving distance of the reference point may be calculated based on the magnitude of the motion vector. Specifically, in step S22 shown in FIG. 11, the moving distance may be calculated such that the larger magnitude the motion vector V1 has, the longer the moving distance of the reference point is. Also in this method, as in the aforementioned embodiment, the player can be prevented from being confused due to the operation performed in the game process being not controlled as intended. However, in this method, since the direction of the motion vector is not used, the player may be more confused about the controllability than in the aforementioned embodiment.

In another embodiment, while the player keeps the input position unchanged (that is, the player keeps on touching the same position on the input surface), the position of the reference point may not be moved. Hereinafter, the process for this case will be described with reference to FIG. 14.

Figure 14:
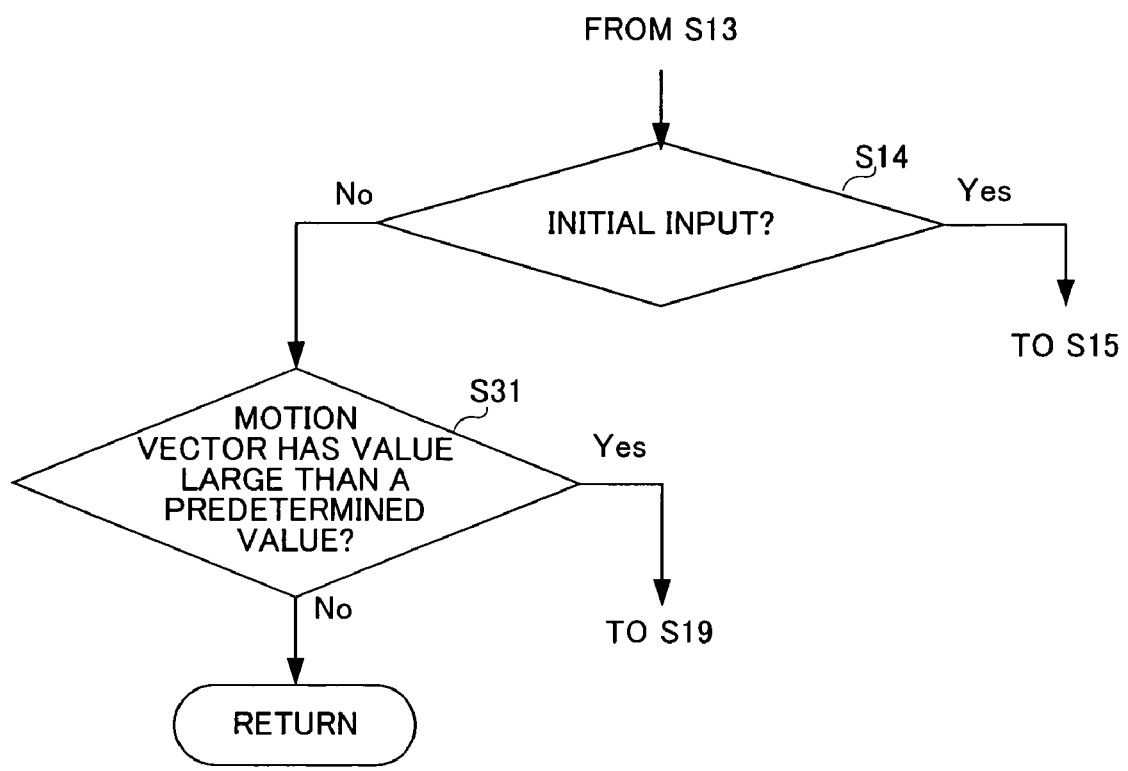
FIG. 14 is a diagram illustrating a reference point setting process according to another embodiment.

FIG. 14 is a diagram illustrating the reference point setting process (FIG. 11) according to another embodiment. FIG. 14 shows only process steps which are not shown in FIG. 11. As shown in FIG. 14, when it is determined in step S14 that an input having been detected in step S13 is not an initial input, the process advances to step S31. On the other hand, when it is determined in step S14 that the input having been detected in step S13 is an initial input, the process advances to step S15 shown in FIG. 11. In step S31, it is determined whether or not the motion vector has a magnitude greater than a predetermined value. When it is determined that the motion vector has a magnitude greater than the predetermined value, the process advances to step S19. On the other hand, when it is determined that the motion vector has a magnitude smaller than the predetermined value, the CPU 22 ends the reference point setting process.

As shown in FIG. 14, only when the motion vector has a magnitude greater than the predetermined value, the process of moving the reference point is performed in step S25. Accordingly, while the touch position inputted by the player is kept almost the same, that is, when the motion vector has a magnitude smaller than the predetermined value, the reference point is not moved. Assuming that the reference point is moved for each frame, the magnitude and the direction of the operation vector are changed even when the player keeps the touch position unchanged, thereby changing the actual operation. Specifically, in this case, although the player keeps the input position unchanged, the moving direction and the movement speed of the player character are changed, thereby changing the actual operation against the player's intension. On the other hand, in the process shown in FIG. 14, when it is determined that the player keeps the input position unchanged, the reference point is not moved, whereby the operation vector is not changed. Therefore, the actual operation is prevented from being changed against the player's intention, thereby enhancing the controllability of the pointing device.

In still another embodiment, in step S31 shown in FIG. 14, it may be determined, based on the direction of the motion vector, whether or not the reference point is to be moved. Specifically, in step S31, it is determined whether or not an angle between the motion vector V1 and the vector V2 from the reference point to the center point is larger than a predetermined angle. Only when the angle is smaller than the predetermined angle, the reference point is moved. Accordingly, the same effect as that obtained through the method for moving the reference point as shown in FIGS. 12 and 13 can be obtained.

Figure 15:
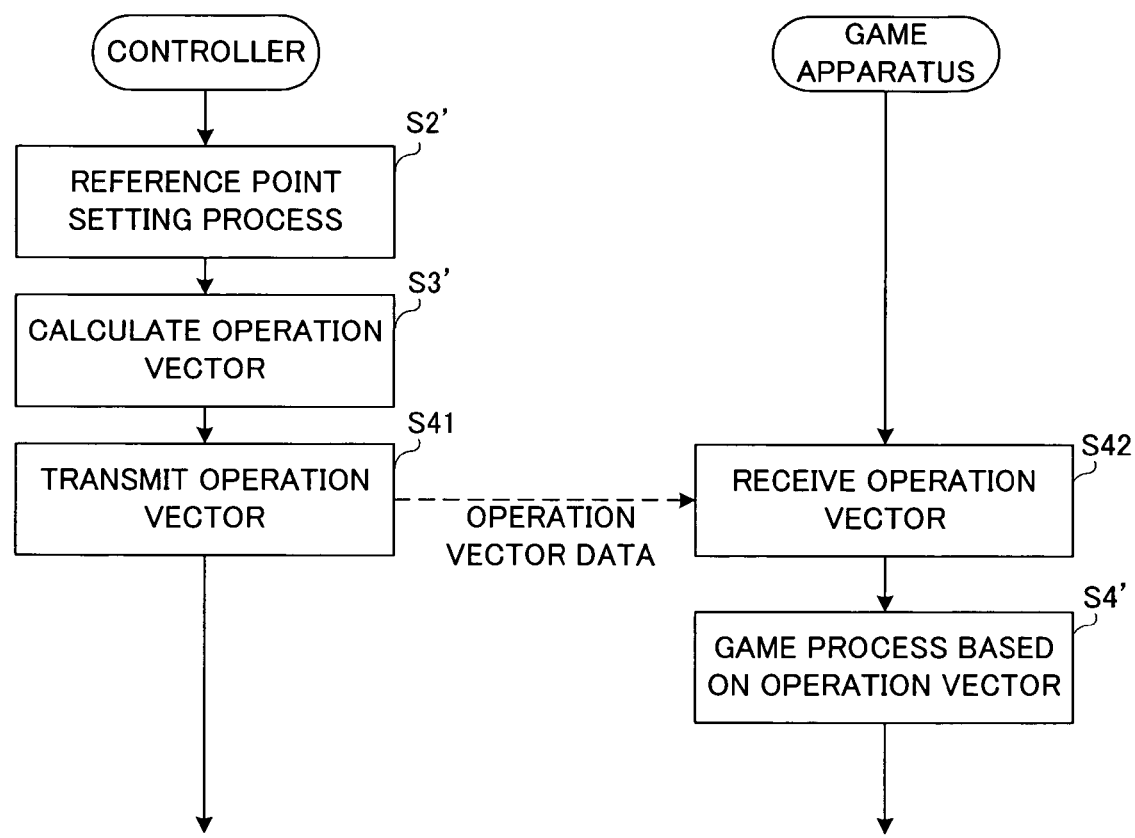
FIG. 15 is a sequence chart illustrating a process flow according to another embodiment.

In the present embodiment, the game apparatus 14 receives the input coordinate data outputted by the controller 20 and executes the process of calculating the operation vector. In another embodiment, the controller 20 may execute the process of calculating the operation vector. FIG. 15 is a sequence chart illustrating respective process flows performed by the controller and the game apparatus 14 when the controller 20 executes the process of calculating the operation vector. That is, the controller 20 executes the reference point setting process and the process of calculating the operation vector in step S2' and S3'. The process of step S2' is the same as the process of step S2 shown in FIG. 10, and the process of step S3' is the same as the process of step S3 shown in FIG. 10. Further, in step S41, the controller 20 outputs (transmits), to the game apparatus 14, the operation vector obtained through the process of step S3'. In step S42, the game apparatus 14 receives the operation vector outputted by the controller 20, and, in step S4', performs a game process in accordance with the operation vector having been received. The process of step S4' is the same as the process of step S4 shown in FIG. 10. As in the game process shown in FIG. 10, steps S2' to S4' are repeated until it is determined that the game is to be ended. Thus, when the controller 20 includes a CPU or a processing circuit operable to execute steps S2 and S3, the controller 20 may calculate the operation vector. In this case, the game apparatus 14 performs only the game process in accordance with the operation vector, and therefore a conventional game apparatus can be used as it is. That is, the controller operable to calculate the operation vector is connected to the conventional game apparatus, thereby realizing the game system as shown in FIG. 1.

Further, the present example embodiment is realized as, for example, a game program and a game apparatus. However, the present example embodiments may not be necessarily used for a game. The present example embodiments can be also applied to a technique for calculating the operation vector using a pointing device capable of detecting a position designated on the screen.

As described above, the present example embodiments can be used for the input data processing program and the input data processing apparatus for enhancing the controllability of the pointing device, and the like.

While the example embodiments have been described in detail, the foregoing description is in all aspects illustrative and not restrictive. It is understood that numerous other modifications and variations can be devised without departing from the scope of the invention.

What is claimed is:

1. A computer-readable storage medium having stored thereon an input data processing program which causes a computer, having a detecting device that detects input positions on an input surface at intervals of a predetermined time period, to execute:

storing, as a reference point position, an initially detected input position among a series of input positions which are continuously detected, in a memory of the computer;

updating the reference point position so as to move the reference point position from the initially detected input position toward a predetermined target position, wherein the predetermined target position represents a center of the input surface;

calculating, when each of the series of input positions is detected, an operation vector connecting between an input position having been most recently detected and the reference point position stored in the memory; and performing a predetermined process using a magnitude and a direction of the operation vector.

2. The storage medium according to claim 1, wherein the updating includes updating the reference point position when each of the series of input positions is detected.

3. The storage medium according to claim 1, wherein the updating includes:

calculating a motion vector ending at the input position having been most recently detected and starting at an input position immediately preceding the input position having been most recently detected;

calculating a moving distance of the reference point position using at least one of a magnitude and a direction of the motion vector; and moving the reference point position stored in the memory to a position obtained when the reference point position is moved toward the predetermined target position over the moving distance.

4. The storage medium according to claim 3, wherein calculating the moving distance includes calculating the moving distance so that the larger magnitude the motion vector has, the longer the moving distance is.

5. The storage medium according to claim 3, wherein calculating the moving distance includes calculating the moving distance so that the closer a direction of the motion vector is to a direction of a straight line connecting between the reference point position and the predetermined target position, the longer the moving distance is.

6. The storage medium according to claim 3, wherein calculating the moving distance includes calculating the moving distance so that the larger component the motion vector has in a direction of a straight line connecting between the reference point position and the predetermined target position, the longer the moving distance is.

7. The storage medium according to claim 3, wherein the updating further includes adjusting, when the moving distance having been calculated is longer than a distance from the reference point position to the predetermined target position, the moving distance to the distance from the reference point position to the predetermined target position, and the moving includes moving, when the moving distance having been calculated is longer than the distance from the reference point position to the predetermined target position, the reference point position stored in the memory using the moving distance having been adjusted.

8. The storage medium according to claim 1, wherein the updating includes calculating a motion vector ending at the input position having been most recently detected and starting at an input position immediately preceding the input position having been most recently detected;

determining whether or not a magnitude of the motion vector has a value larger than a predetermined value; and moving the reference point position stored in the memory only when the determination determines that the magnitude of the motion vector has a value larger than the predetermined value.

9. The storage medium according to claim 3, wherein the reference point position storing stores, when the initially detected input position is within a predetermined area including the predetermined target position, the initially detected input position as the reference point position in the memory, and stores, when the initially detected input position is outside the predetermined area, the predetermined target position as the reference point position in the memory.

10. An input data processing apparatus comprising:
a detecting device that is configured to detects input positions on an input surface at intervals of a predetermined time period;
a storage device which is configured to stores, as a reference point position, an initially detected input position among a series of input positions which are continuously detected;
a processing device which is configured to update the reference point position so as to move the reference point position from the initially detected input position toward a predetermined target position, and which is configured to calculates, when each of the series of input positions is detected, an operation vector connecting between an input position having been most recently detected and the reference point position stored in the storage device and which performs a predetermined process using a magnitude and a direction of the operation vector
wherein the predetermined target position represents a center of the input surface.

11. The input data processing apparatus according to claim 10, wherein the updating by the processing device includes updating the reference point position when each of the series of input positions is detected.

12. The input data processing apparatus according to claim 10, wherein the updating by the processing device includes:
calculating a motion vector ending at the input position having been most recently detected and starting at an input position immediately preceding the input position having been most recently detected;
calculating a moving distance of the reference point position using at least one of a magnitude and a direction of the motion vector; and
moving the reference point position stored in the memory to a position obtained when the reference point position is moved toward the predetermined target position over the moving distance.

13. The input data processing apparatus according to claim 12, wherein the moving distance is calculated so that the larger magnitude the motion vector has, the longer the moving distance is.

14. The input data processing apparatus according to claim 12, wherein the moving distance is calculated so that the closer a direction of the motion vector is to a direction of a straight line connecting between the reference point position and the predetermined target position, the longer the moving distance is.

15. The input data processing apparatus according to claim 12, wherein the moving distance is calculated so that the larger component the motion vector has in a direction of a straight line connecting between the reference point position and the predetermined target position, the longer the moving distance is.

16. The input data processing apparatus according to claim 12, wherein
the updating further includes adjusting, when the moving distance having been calculated is longer than a distance from the reference point position to the predetermined target position, the moving distance to the distance from the reference point position to the predetermined target position, and
the moving includes moving, when the moving distance having been calculated is longer than the distance from the reference point position to the predetermined target position, the reference point position stored in the memory using the moving distance having been adjusted.

17. The input data processing apparatus according to claim 10, wherein the updating by the processing device includes:
calculating a motion vector ending at the input position having been most recently detected and starting at an input position immediately preceding the input position having been most recently detected;
determining whether or not a magnitude of the motion vector has a value larger than a predetermined value; and
moving the reference point position stored in the memory only when the determination determines that the magnitude of the motion vector has a value larger than the predetermined value.

18. The input data processing apparatus according to claim 12, wherein the reference point position storing includes storing, when the initially detected input position is within a predetermined area including the predetermined target position, the initially detected input position as the reference point position in the memory, and storing, when the initially detected input position is outside the predetermined area, the predetermined target position as the reference point position in the memory.

* * * * *